United States Patent [19]
Astle

[11] 3,854,440
[45] Dec. 17, 1974

[54] SLIDE STAINING APPARATUS
[76] Inventor: Thomas W. Astle, 607 Harbor View Rd., Orange, Conn. 06477
[22] Filed: Apr. 24, 1972
[21] Appl. No.: 246,720

[52] U.S. Cl.......................... 118/7, 118/58, 118/429
[51] Int. Cl............................................. B05c 11/00
[58] Field of Search............ 118/429, 421, 50, 7, 8; 134/94–96; 117/113–115

[56] References Cited
UNITED STATES PATENTS
| | | | |
|---|---|---|---|
| 786,727 | 4/1905 | Cazin | 118/429 UX |
| 2,159,091 | 5/1939 | Kopitke | 118/429 X |
| 2,165,364 | 7/1939 | Ferngren | 118/429 X |
| 2,908,249 | 10/1959 | Rokosz et al. | 118/429 X |
| 3,400,726 | 9/1968 | Du Grail | 134/95 |
| 3,526,203 | 9/1970 | Kinney et al. | 118/7 |

Primary Examiner—Morris Kaplan
Attorney, Agent, or Firm—DeLio and Montgomery

[57] ABSTRACT

Apparatus and method of staining slide cultures in which slides are placed in a staining chamber having a bottom opening and flooded with a stain from receptacles therebelow. After each staining operation, the stain is drained back to its receptacle for reuse.

An overflow chamber surrounds the staining chamber to enhance washing.

11 Claims, 5 Drawing Figures

PATENTED DEC 17 1974

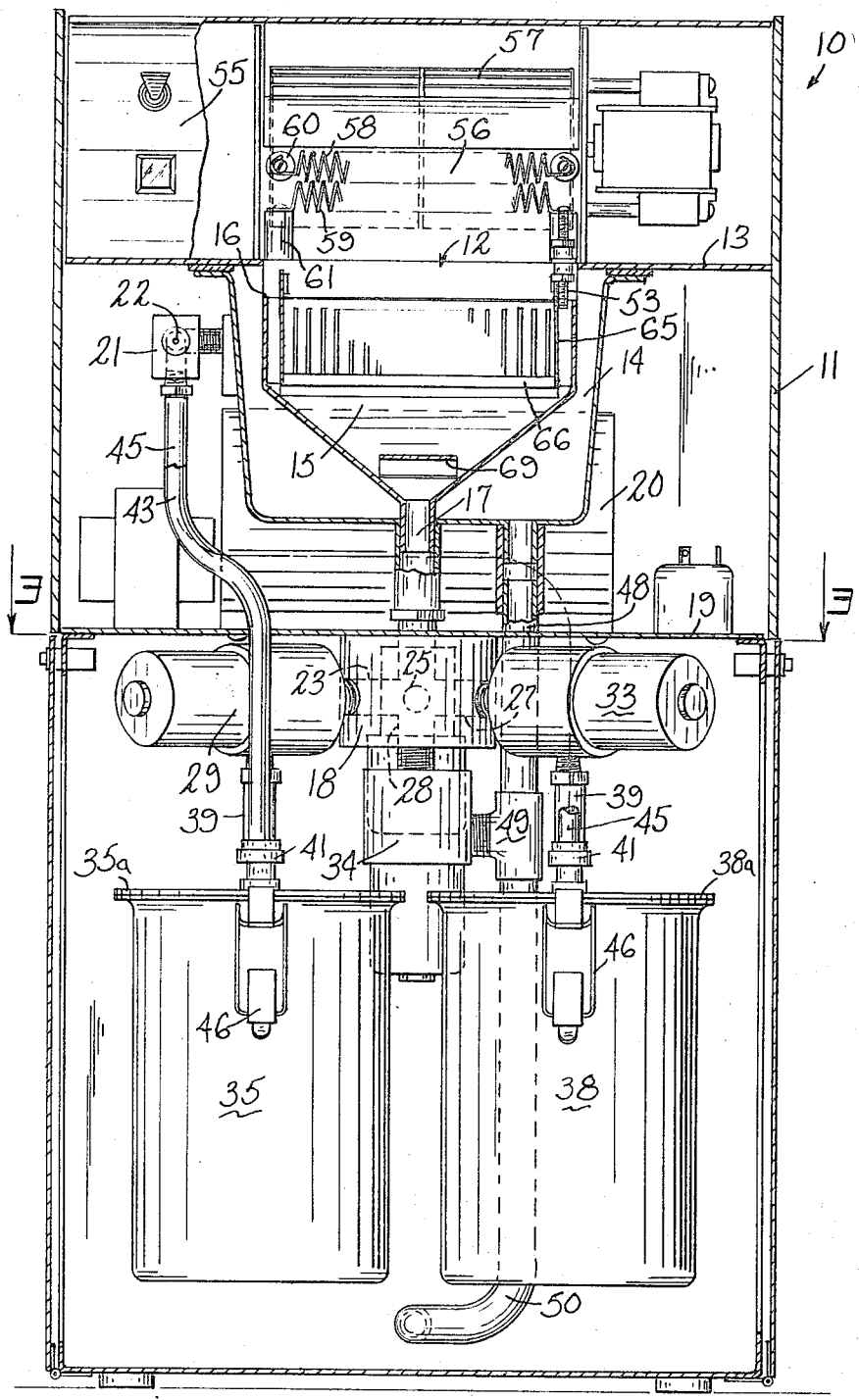

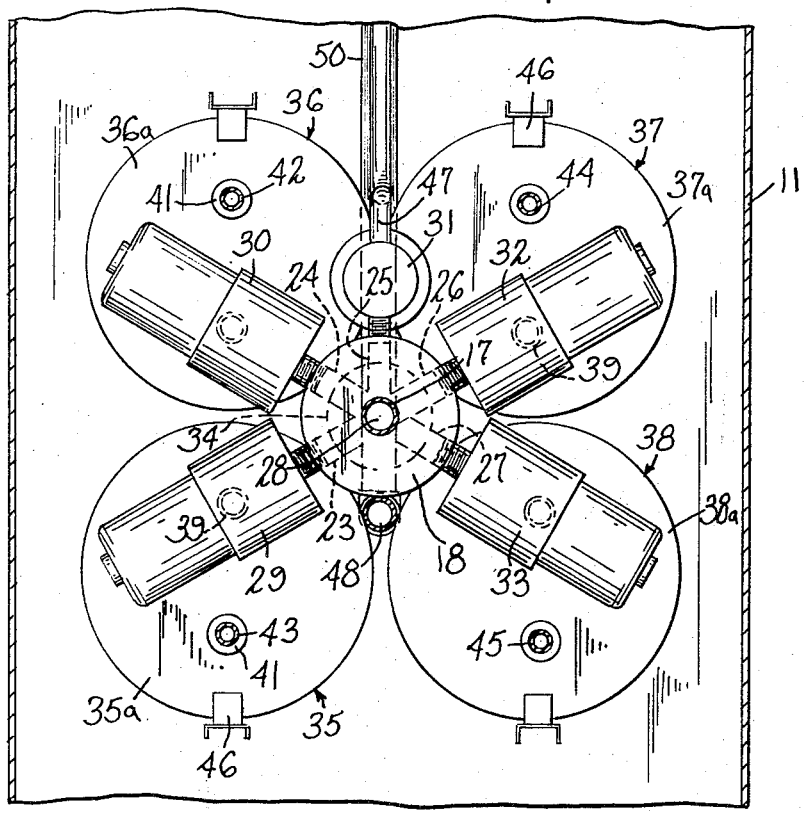

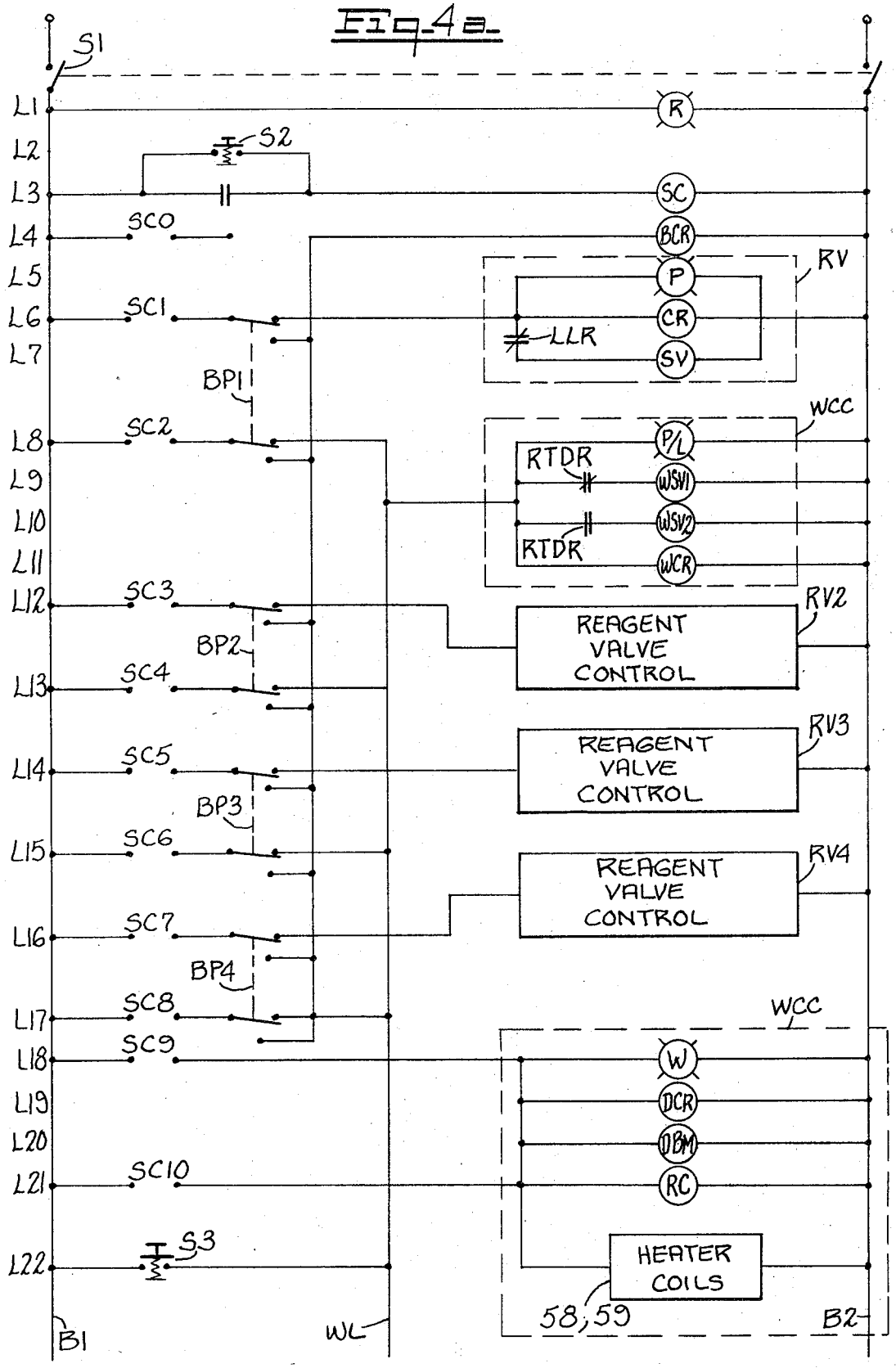

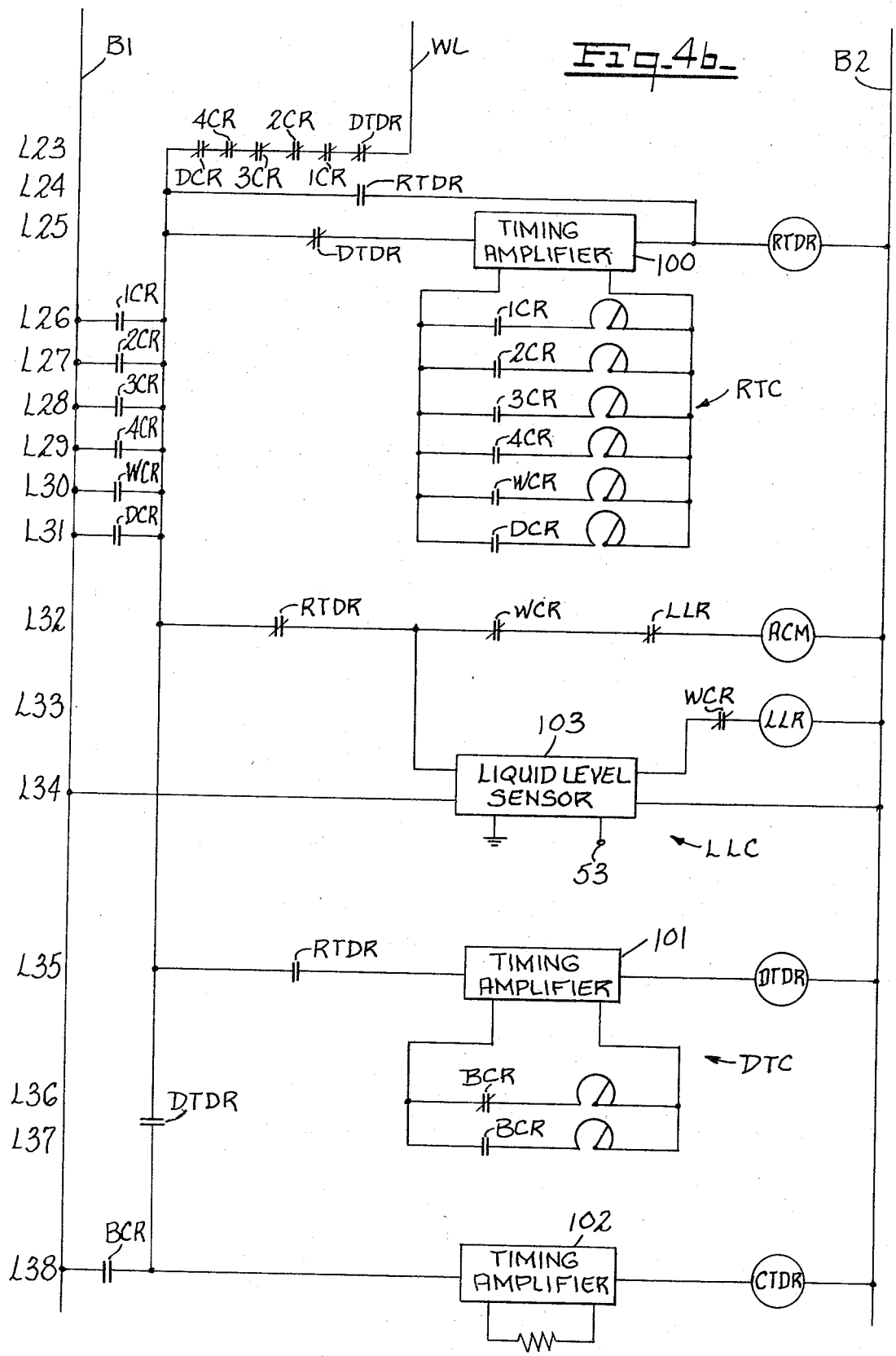

3,854,440

SLIDE STAINING APPARATUS

This invention relates to staining apparatus and more particularly relates to apparatus for staining slides used in the biomedical field.

In the biomedical field there are a number of procedures that involve treating specimens on microscope slides with various reagents. In the fields of hematology, histology, cytology and microbiology, various cultures, smears and organisms are placed on microscope slides, usually of the 1 × 3 dimension, and then treated with vaious stains, counterstains, decolorizers, fixers, dehydrators and washes to properly identify or differentiate the specimen under study.

Where these procedures are performed manually the various reagents are generally poured on to the slides and washed off, or the slides may be placed in racks and dipped in one reagent container and then the next. Each reagent is held in contact with the specimen a predetermined length of time and the containers may be placed in rinses between dips into the various dyes.

The dyes are very potent and messy to handle. These procedures, while simple, are lengthy and tedious considering the volumes of slides that may have to be prepared, and the quality of the finished product may be affected by the procedure used.

Various devices have been proposed to mechanize or automate the slide staining techniques. A most common approach is to provide an indexable slide rack containing device which moves the slides from one container to the other in either a reciprocatory or rotating motion and then moves vertically or horizontally to dip the slides into the dye and remove the slides therefrom. Machines have also been constructed to transport slides along a processing line which includes containers for the various dyes and intermittent rinses. These known devices generally are relatively large in dimension, and in many cases discharge the dyes after one cycle of use. Another known device floods a slide containing chamber with a dye, but requires a suction device to remove the dye. This known device provides no apparent means for supplying rinse water to the slide chamber.

The present invention provides a new and improved slide staining apparatus which requires no movement of the slides, but provides a container for the slides which may be flooded with various dyes, fixers, cleaning agents and flushing liquids, and such liquids saved for reuse where desired. Additionally, the present invention provides an apparatus of the type described which may be connected to a source of tap water for flushing and cleaning purposes.

The instrument used in accordance with the invention may very efficiently perform the staining procedures utilized in most bacteriology laboratories, and is readily usable in any other slide staining techniques.

Birefly stated, the invention in one form thereof comprises a container which is open at the top to receive a rack of slides. The container has a bottom opening for introduction of liquid thereto through a manifold. Connected to the manifold are various receptacles for the dyes which may be pressurized to force dyes from the receptacles to the aforementioned chamber. Each dye retaining receptacle is connected to the manifold through selectively controllable valves. The unit preferably contains its own source of fluid pressure for pressurizing the receptacles and the fluid pressure source is disabled when the dye reaches a predetermined level in the chamber. When a staining operation is completed, the dye in the chamber is drained back to its receptacle under the influence of gravity.

An object of this invention is to provide a new and improved apparatus for staining slides with various reagents.

Another object of this invention is to provide an apparatus for staining slides having new and improved means and steps for moving the reagents selectively to immerse the slides while the slides are maintained stationary.

A further object of this invention is to provide apparatus of the type described having new and improved means for selectively applying various stains to slides at predetermined times, flushing the slides, and to provide a staining cycle of operation while retaining the various dyes for reuse.

A still further object of the invention is to provide a device of the type described which is wholly self-contained, compact and economical.

The features of the invention which are believed to be novel are particularly pointed out and distinctly claimed in the concluding portion of this specification. The invention, however, both as to its organization, operation and procedural steps, together with further objects and advantages thereof, may best be appreciated by reference to the following detailed description taken in conjunction with the drawings, wherein:

FIG. 2 is a sectional view seen in the plane of lines 2—2 of FIG. 1;

FIG. 3 is a view seen in the plane of lines 3—3 of FIG. 2; and

FIGS. 4a and 4b are a schematic diagram of a control network for performing the steps of operation of a method embodying the invention.

Figure 1:
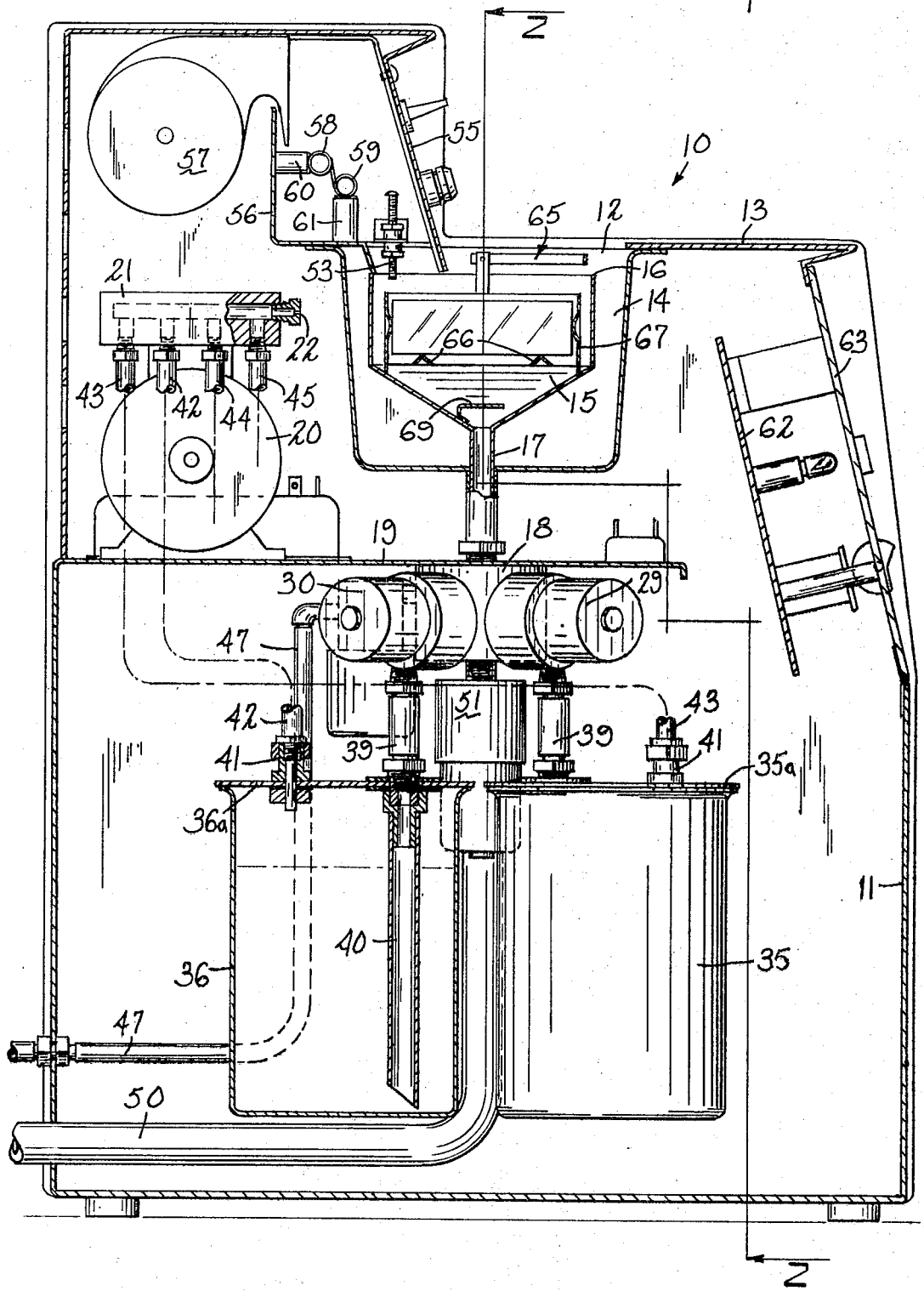
FIG. 1 is a side elevation of a unit embodying the invention with the cover thereof removed.

An apparatus 10 embodying the invention generally comprises a housing 11 having an opening 12 in an upper surface 13 thereof which provides communication to a chamber 14, hereinafter referred to as the overflow chamber.

Disposed within chamber 14 below the upper edge thereof is a member defining a chamber 15 constructed to receive a tray for slides therein. The upper edge 16 of chamber 15 is below the upper edge of chamber 14. Conduit 17 extends from the bottom tapered portion of chamber 15 through the bottom of chamber 14, and suitable sealing means as more clearly shown in FIG. 2, to a manifold 18 disposed beneath a platform 19. Supported on platform 19 is a motor-compressor unit 20 which supplies air under pressure to a manifold 21 which communicates with the ambient atmosphere through a vent or bleed orifice 22.

Manifold-providing member 18 has horizontal passages 23, 24, 25, 26, 27 and a vertical passage 28 in communication with valves 29, 30, 31, 32, 33 and 34, respectively. The valves are preferably of the type operated by solenoids, as hereinafter described. Each of the valves 29, 30, 32 and 33 is adapted to selectively connect receptacles 35, 36, 37 and 38, respectively, to manifold 18. Each of the receptacles is adapted to provide a reagent reservoir which may be pressurized to transport the reagent to chamber 15 through manifold 18.

Each of the receptacles has a top wall in the form of a sealing member or cover 35a, 36a, 37a, 38a which is connected to and supported by a line and couplings, generally identified as 39, which extends from its associated valve, as exemplified by the valves 29 and 30 in FIG. 1. Each of couplings 39 extends to a conduit 40 which reaches almost to the bottom wall of the receptacles. Also coupled to the top wall of each container is a coupling 41 connected to a conduit 42 in communication with fluid pressure manifold 21. As exemplified by conduit 42 in FIG. 1, each of conduits 42, 43, 44 and 45 is led into one of receptacles 35 – 38 to apply fluid pressure to the liquid therein. The bodies of the receptacles 35 are joined to their top walls by latching and support means on two sides thereof, as exemplified in FIG. 2. The clamping and support means may comprise the common over-center type latch as identified by the reference numeral 46.

With this construction, the receptacles 35 – 38 may be removed from sealing engagement with their respective top wall members and filled or refilled with the appropriate reagent.

A line 47 extends through the back wall of casing 11 to water solenoid valve 31 to provide fresh water through manifold passage 25. A drain conduit 48 leads from the bottom of overflow compartment 14 through a coupling 49 to a drain line 50. Coupling 49 is connected to a drain valve 34.

Valve 34 is provided to permit drain and subsequent discharge of water introduced into chamber 15. When valve 34 is opened water will drain through tube 17, manifold passage 28, valve 34, coupling 49 and drain line 50. Additionally, any water that is overflowed from chamber 15 into chamber 14 will drain through conduits 48 and 50. An adjustable liquid level sensing device 53 extends below the upper edge 16 of chamber 15. The purpose of the sensing device is to sense when the level of the liquid in chamber 15 has reached a predetermined level above slides in chamber 15 and prevent further addition of liquid to chamber 15.

A panel 55 on the front of casing 11 together with a baffle member 56 defines a duct for air from a blower 57. Blower 57 will move air past heating coils 58 and 59 supported on insulators 60 and 61 on member 56 down into chamber 15 and through the slides therein to dry the slides.

The slides 64 may be carried in a container or basket 65 in spaced apart side-by-side relation. Container 65 is generally open at the bottom with slide support members 66 extending between the sidewalls thereof. The end walls 67 may have somewhat resilient ledges 68 therein to aid in holding the slides in an upright position.

When applying the reagents and water under pressure there may be a tendency for the liquids to geyser. Therefore, a baffle 69 is provided to overlie the opening of conduit 17 into chamber 15.

Controls for the operation of the device may be mounted to a panel 62 supported from a removable front panel member 63 for easy access.

One operation of the apparatus and method will be described with respect to a specific staining procedure known as the Gram-staining technique. This technique uses four reagents, crystal violet (blue) Grams iodine (fixer), alcohol (decolorizer) and safranine (red). Assume that these four reagents are in receptacles 35, 36, 37 and 38, respectively.

The organism to be identified as gram-positive or gram-negative is first smeared on the slides and heat fixed by gentle drying. The slides are then placed in a rack which is, in turn, placed in chamber 15. the compressor 20 is started and each of the receptacles 35, 36, 37 and 38 is pressurized. Then valve 29 is opened and the crystal violet (blue) dye floods chamber 15 until it reaches a level sensed by sensor 53 which causes valve 29 to close, and also halts operation of the air compressor. Pressure in the receptacle then bleeds off through orifice 22. Since valve 29 is closed, the blue dye is trapped in the chamber 15. After a predetermined time, adjustable by the operator, valve 29 is opened allowing the blue dye to drain from the chamber 15 back to receptacle 35 under the influence of gravity since air pressure has been bled off to the stmosphere. Valve 29 is now closed and valve 31 is opened to supply tap water to manifold 18 and to chamber 15. At this time, sensor 53 may be disabled to allow the wash water to overflow the slide chamber 15, be received in chamber 14 and carried out drain 50. After a predetermined wash time, the valve 31 is closed and valve 34 is opened to drain chamber 15 and also flush conduit 17 and manifold 18. After the drain period, compressor 20 is again started and valve 30 is opened, and the chamber 15 is flooded with the iodine fixer until the level is sensed by sensor 53 which causes valve 30 to close and compressor 20 to cease operation. After a predetermined time, the valve 30 is again opened to drain the iodine back to receptacle 36. The wash cycle is then repeated with the tap water. Then valve 32 is opened and compressor 20 again started to flood chamber 15 with alcohol. After a predetermined time valve 32 is again opened and the alcohol flows under the influence of gravity back to receptacle 37. The tap water wash is again repeated.

Finally, chamber 15 is flooded with the red dye from receptacle 38 and valve 33 is opened for a predetermined time. Valve 33 is closed and compressor 20 halted when the level is sensed by sensor 53. After a predetermined time interval, valve 33 is again opened, the red dye flows under the influence of gravity back to receptacle 38 and the washing is repeated. At this time, the blower 57 is turned on and power supplied to heating coils 58 and 59, heated air is blown through the slide chamber for a predetermined time to dry the slides. The cycle is then completed and the slides are removed for reading.

A cycle of operation has been described with respect to the Gram-staining technique.

However, it is to be understood that the apparatus may be used for any staining technique in any of the fields where applicable.

The foregoing steps of operation may be done either manually or under a programmed control.

A network for performing or controlling the performance of a sequence of operations as described is set forth in FIGS. 4a and 4b. FIG. 4b is a continuation of FIG. 4a. The network comprises a pair of control bus lines B1 and B2 having a plurality of control lines L1 – L38.

The network generally comprises a control circuit RV1 – RV4 for each reagent valve 29, 30, 32 and 33, respectively, a wash cycle control circuit WCC, a dryer cycle control DCC, a liquid timer control RTC, a drain time control DTC, and liquid level control LLC. All of the reagent valve controls are the same and only RV1 is schematically shown.

Initially, the network is rendered operative by closing power on-off switch S1. Pilot light R, line L1 is illuminated. The reagent times and staining times are set by potentiometers in lines L26 – L29, the wash times by the potentiometer in line L30 and the drying time by the potentiometer in line L31. The contacts 2CR, 3CR, and 4CR in lines L27 – L29 are controlled by relays SC in each of RV2 – RV4. The timing amplifiers 100, 101, and 102 are of the RC type adapted to emit a signal a predetermined time after they are energized. The times are predetermined by the potentiometers or resistances paralleled therewith. The liquid level sensor 103 emits a signal when the liquid establishes a circuit between probe 53 and the walls defining chamber 15, which constitute ground.

To commence a cycle of operation switch S2, line L2 is momentarily closed to excite coil SC of a stepping switch (not shown) having contacts SC0 – SC10. The stepping switch is one of conventional construction with a stepping SC coil which advances a contact making rotor through a series of contacts each time the stepping coil is energized, and a reset coil RC to reset the switch to contacts SC0. The stepping switch advances one step and contacts SC1 in line L6 are closed; pilot light P, line L5, is illuminated; relay CR, line L6 is energized to pick up its contacts in line L26 and drop out its contact in line WL; and solenoid SV is energized to open valve 29 to connect receptacle 35 to chamber 15. Also air compressor motor relay ACM, line L32 is energized to commence operation of air compressor 20. The reagent in receptacle 35 is forced under pressure through manifold 18 to chamber 15.

When the liquid level in chamber 15 reaches probe 53, sensor 103 passes a signal to liquid level relay LLR, line L33, which opens its normally closed contacts in circuits RV1, line L7, RV2 –RV4, and line L39. Solenoid SV is deenergized and valve 29 closes, holding the reagent in chamber 15. Relay ACM, line L32 is also de-energized, and pressure on the receptacles bleeds off through orifice 22.

When contacts 1CR are closed a timing cycle determined by the potentiometer in line L26 commences. At the end of this predetermined time, amplifier 100 turns on and liquid time relay RTDR is energized. Relay RTDR latches itself in through its contact in line L24, drops out its contacts in line L9 and L32; and picks up its contacts in lines L10 and L35. Liquid level sensor 103 is disabled, and drain time amplifier 101, line L35, starts to time.

When amplifier 101 times out drain time relay DTDR is energized and picks up its contact in line WL to energize timing amplifier 102 which has a predetermined set time delay.

When relay LLR was de-energized, its normally closed contact in line L7 closed to again energize solenoid SV, open valve 29 and allow the reagent in chamber 15 to drain back to receptacle 34.

When amplifier 102 times out, stepping control relay CTDR is energized and picks up its contact in line L2 to briefly energize stepping switch coil SC. This opens contacts SC1 and closes contacts SC2.

When relay CR, line L6 is de-energized upon the stepping action, it drops out its contact in line L26 and relays DTDR and CTDR are de-energized.

When contacts SC2 are closed, wash control relay WCR, line L11 in circuit WCC picks up and closes its contacts in line L30 to commence timing of amplifier 100. Also solenoid WSV1 is energized to open valve 31 and permit tap water to pass through manifold 18 to flush chamber 15. The water will overflow into chamber 14 and drain through conduit 50. The liquid level sensor 103 and air compressor are disabled since the WCR contact in lines L32 and L33 are opened.

Timing amplifier 100 is energized through WCR contacts in line L30. After a predetermined time relay RTDR is energized and latches itself in. Its contact in line L9 is opened to de-energize solenoid WSV2 and close valve 31. At the same time its contact in line L10 closes to energize solenoid WSV2 and open drain valve 34. The water now drains from chamber 15. Relays DTDR and CTDR operate as previously described, and the stepping switch advances to contact SC3. The above-described operation is repeated for each reagent receptacle through contacts SC8.

When the stepping switch reaches contacts SC9 a drying operation is initiated. Pilot lamp W is illuminated. Heater coils 58 and 59 are placed in circuit as is the dryer blower motor relay DBM which closes contacts to the motor which operates blower 57. Dry control relay DCR line L19 is energized, closes its contacts in lines L31 to initiate a timing cycle by timing amplifier 100, in a manner previously described. Then relays DTDR and CTDR are operated to stop the stepping switch to contact SC10. This energizes stepping switch reset coil RC, line L21 to reset the switch to contact SC0. The system is then ready for another cycle of operation.

The timing potentiometers for the four reagents are placed on the front panel 62, for easy time setting by the technician. The various pilot lights P are positioned adjacent each timing control to indicate which operations are in progress. By-pass switches BP1 – BP4 are provided to by-pass each of circuits RV1 – RV4. When any of these switches is moved to the other position, by-pass relay BCR is energized when the associated contacts SC1, SC2; SC3, SC4; SC5, SC6; or SC7, SC8 are closed. When relay BCR is energized it picks up its contact in line L38 to energize relay CTDR and cause the stepping switch to advance, thus eliminating any selected reagent or receptacle from the cycle. The by-pass switches are also located on panel 62 adjacent the associated timing controls and pilot lights.

A manual wash cycle may be initiated by closing switch 53, line L22, to connect line WL to bus line B1. This function is provided for initial clearing of the manifold and conduits before or after a cycle of automatic operation.

It will be apparent that all or less than all of the reagents may be used, and the time of immersion of the slides in any reagent may be set by the operator. Apparatus embodying the invention may be constructed for any number of reagents and provide a multiplicity of different types of staining techniques. Various types of controls may be provided to produce the steps of operation. A relay controlled network has been shown to more clearly represent the steps involved; however, solid state circuitry may be preferred for maintenance purposes.

The controls provide a timing setting facility and by-pass for each reagent, and the pilot lights P, P/L and W, which may be color coded to indicate at any time the event taking place.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. Apparatus for staining slides comprising a staining chamber adapted to receive slides therein, said chamber having an open top and a lower passage communicating with a manifold, a plurality of receptacles adapted to contain reagents, valving means connecting each of said receptacles to said manifold, means for operating said valves to selectively allow a reagent from a receptacle to be delivered to said chamber and returned to its receptacle, a second chamber surrounding said staining chamber and adapted to catch any overflow therefrom, additional inlet valve means and outlet valve means, said inlet valve means adapted to connect said manifold to a fresh water tap supply, said outlet valve means connecting staining chamber to a drain, and conduit means connecting said second chamber to said drain.

2. The apparatus of claim 1 wherein said manifold extends vertically from said staining chamber, a plurality of conduits extending radially from said manifold, said valving means selectively connecting each of said conduits to said manifold, each of said receptacles being connected to one of said conduits, said outlet valve positioned below said manifold, means for pressurizing said receptacles to deliver reagents therefrom to said chamber when its respective valve is opened, means for relieving pressure on said receptacles when fluid is not being delivered to said chamber so that when its respective valve is again opened the reagent will return to the chamber from whence it was delivered under the influence of gravity.

3. Tha apparatus of claim 1 further including means for sensing a predetermined level of fluid in said staining chamber, and means responsive to said sensing means for interrupting further introduction of reagent to said staining chamber.

4. The apparatus of claim 2 further including means for sensing a predetermined level of fluid in said staining chamber, means responsive to said sensing means for closing said selectively open valving means.

5. The apparatus of claim 4 further including control means for selectively operating said valving means and said pressuring means to serially introduce reagents into said chamber and drain reagents therefrom.

6. The apparatus of claim 5 further including means for setting the time of each reagent in said chamber.

7. The apparatus of claim 5 further including means for inhibiting operation of any of said valving means and eliminating any reagent from a staining operation.

8. Slide staining apparatus comprising an open top slide staining chamber having a bottom opening leading to a manifold, a plurality of conduits extending radially from said manifold in an essentially common plane, one of said conduits arranged to be connected to a fresh water tap supply, a first valve in said one conduit, a reagent receptacle connected to each of said other conduits, a valving means in each of said other conduits, a discharge drain conduit extending from said manifold and a drain valve therein, means for pressurizing said receptacles and selectively opening and closing said first valve, said other valves and said discharge valve to flood said chamber with a reagent, return the reagent to its receptacle, rinse said chamber with water, and discharge the water through said drain valve until a selected number of reagents have been introduced into said chamber and returned to their receptacles and an overflow chamber surrounding said staining chamber and a second drain conduit leading to said discharge drain conduit behind said drain valve whereby overflow from said staining chamber drains directly to discharge.

9. The apparatus of claim 8 further including a baffle member overlying said chamber bottom opening and spaced upwardly therefrom.

10. The apparatus of claim 8 further including means for sensing a predetermined level of liquid in said staining chamber and removing pressure from said receptacles in response thereto.

11. The apparatus of claim 8 further including means for inhibiting operation of any of said valving means to eliminate any reagent from a staining operation.

* * * * *

PO-1050
(5/69)

UNITED STATES PATENT OFFICE
CERTIFICATE OF CORRECTION

Patent No. 3,854,440            Dated    December 17, 1974

Inventor(s) Thomas W. Astle

It is certified that error appears in the above-identified patent and that said Letters Patent are hereby corrected as shown below:

Column 1, line 58, "Birefly" should read -- Briefly --

Column 7, line 28, before "staining" insert -- said --.

Signed and sealed this 3rd day of June 1975.

(SEAL)
Attest:

RUTH C. MASON
Attesting Officer

C. MARSHALL DANN
Commissioner of Patents
and Trademarks